(12) United States Patent
Strang

(10) Patent No.: US 6,747,876 B1
(45) Date of Patent: Jun. 8, 2004

(54) SEISMIC DATA ACQUISITION MODULE

(75) Inventor: Ian Mark Strang, Calgary (CA)

(73) Assignee: Geo-X Systems, Ltd., Calgary (CA)

( * ) Notice: Subject to any disclaimer, the term of this patent is extended or adjusted under 35 U.S.C. 154(b) by 0 days.

(21) Appl. No.: 10/328,472

(22) Filed: Dec. 24, 2002

Related U.S. Application Data

(60) Provisional application No. 60/344,384, filed on Dec. 28, 2001.

(51) Int. Cl.[7] .................................................. H05K 7/18
(52) U.S. Cl. ........................ 361/796; 361/752; 361/797; 361/800
(58) Field of Search ................................ 361/796, 752, 361/797, 800, 714, 709, 750, 746; 348/836; 428/901

(56) References Cited

U.S. PATENT DOCUMENTS

| | | | |
|---|---|---|---|
| 4,493,063 A | | 1/1985 | Tims et al. |
| 4,666,762 A | * | 5/1987 | Yamamoto .................. 428/216 |
| 4,725,992 A | | 2/1988 | McNatt et al. |
| 5,550,787 A | | 8/1996 | Rialan et al. |
| 5,627,798 A | | 5/1997 | Siems et al. |
| 5,822,273 A | | 10/1998 | Bary et al. |
| 5,825,621 A | * | 10/1998 | Giannatto et al. .......... 361/701 |
| 6,316,935 B1 | * | 11/2001 | Vanzuilen .............. 324/207.21 |
| 6,430,106 B1 | | 8/2002 | Staron |
| 6,538,196 B1 | * | 3/2003 | MacDonald et al. ... 174/35 GC |

FOREIGN PATENT DOCUMENTS

DE        00473242 A1 *   7/1991

* cited by examiner

*Primary Examiner*—Randy W. Gibson
*Assistant Examiner*—Hung Bui
(74) *Attorney, Agent, or Firm*—W. Allen Marcontell

(57) ABSTRACT

A seismic data acquisition module includes a motherboard that is environmentally protected as a independent unit by an integral sheath, envelope or encapsulating cover. The motherboard unit is suitably configured for rapid and frequent manual removal from the interior cavity of a protective outer housing for compact and more secure packaging as well as more convenient transport over great distances, if necessary, to successively different survey sites. At a new survey site, the motherboard units may be inserted into more bulky but also more rugged or waterproof outer housings that are provided with environmentally tight cable connectors. The outer housings, having a capital value of only a fraction of the electronic motherboard units, may have arrived at the new site at a different time and may even be distributed in the new survey field at the time the motherboard units arrive.

20 Claims, 2 Drawing Sheets

SEISMIC DATA ACQUISITION MODULE

CROSS-REFERENCE TO RELATED APPLICATION

This application claims the benefit of U.S. Provisional Application Ser. No. 60/344,384 filed Dec. 28, 2001.

BACKGROUND OF THE INVENTION

1. Field of the Invention

The present invention relates to seismic survey equipment. In particular, the invention relates to equipment assembly combinations and the logistics of equipment deployment.

2. Description of the Related Art

In principle, a seismic survey represents an analysis of the earth's layered density as indicated by seismic reflections from abrupt density discontinuities at the layer interfaces. The analysis is also influenced by seismic wave propagation velocities respective to the differences in strata density or elasticity. A precisely timed seismic event of known energy magnitude such as the ignition of buried explosives in a shallow borehole or that of a hammer shock propagated against the earth's surface is launched against the earth at a precisely known location and time. Seismic wave reflections of this man-made seismic event are detected by arrays of geophones distributed in an orderly grid over the area of interest. The location of each geophone array is precisely mapped relative to the location of the seismic event. As the seismic wave from the timed event travels out from the source, reflections from that original seismic wave are returned to the surface where they are detected by the geophones. The geophones respond to the receipt of a wave with a corresponding analog electrical signal which is summed with the signals of the other geophones within the array in analog form. The summed analog signals are received from the geophone arrays by data acquisition modules which digitize the analog signal stream for retransmission to a central recording unit as a series of digital data packets. Among the significant data preserved by the data acquisition modules is the amplitude or the strength of the reflected wave and the exact time lapse from the moment the event occurred.

In a single survey, there may be thousands of geophone arrays. Consequently, the data flow must be orderly and organized. For example, the data acquisition modules transmit digital geophone array values in digital data packets containing a predetermined number of digital data bits. In addition to a seismic signal value, each of these data packets carries the identity of the specific geophone array from which the data originates and either explicitly or implicitly, the time it was received by the geophone. The acquisition modules are programmed to transmit a data packet respective to each geophone array channel at a predetermined frequency. The variable data in a data packet represents an instantaneous snapshot of the analog signal flow from the geophone array channel.

Managing an orderly flow of this massive quantity of data to a central recording unit requires a plurality of digital signal processing devices. The data acquisition modules convert the geophone analog data to digital data and transmit the digital data packets along receiver lines or radio transmission channels. There may be numerous data acquisition modules transmitting respective data packets along a single receiver line or channel. Among the functions of each data acquisition module is data packet transmission timing respective to the flow of data packets from other data acquisition modules transmitting respective data packets along the same receiver line. Typically, two or more receiver lines connect with base line units that further coordinate the data packet flow of numerous additional base line units into a base transmission line for receipt by a central recording unit.

Seismic surveying is often carried out under extremely inhospitable conditions of heat or cold, tropics or arctic, land and sea, desert or swamp. Regardless of the environment, the geophones must be positioned precisely relative to the seismic source event. Necessarily, manual placement of the geophones is required.

Due to the signal processing complexity of data acquisition modules and base line units, the "hard wired" electronic component assembly of these devices is expensive and relatively fragile. For this reason, the component assemblies are enclosed by protective environmental housings. There are as many different types of protective housings as there are environmental conditions. In some conditions, the housing must be waterproof to several hundred feet of depth, for example, but weight is of no great concern. In other conditions, mountains for example, the housing must be capable of withstanding severe shock as when falling from some height onto bare rock. Consequently, a world-wide seismic survey enterprise, in the past, has been required to maintain large inventories of seismic data acquisition equipment for rapid response for new surveys under diverse physical conditions.

As expensive as the protective housing may be, the cost of a housing is but a small fraction of the cost of the electronic component assembly that the housing protects. Moreover, to a great degree, the electronic component assembly in one type of protective housing is the same as in a different type of housing. Accordingly, such seismic survey groups must commit a large percentage of their equipment capital to replicate assemblies.

In other scenarios, the weight and volume of a protective housing is several times greater than the weight and volume of the electronic circuitry inside of the housing. Packing and preparing a seismic survey equipment assembly for delivery to a survey site is a large undertaking. Consequently, transport of a given survey equipment assembly from one survey site to another, distant, site is both, expensive and time consuming.

SUMMARY OF THE INVENTION

It is an object of the present invention, therefore, to reduce the capital cost of seismic survey equipment inventory for world-wide, multiple environment operations.

Another object of the present invention is to expedite the transport time and reduce the expense for transferring critical seismic survey equipment from one survey location to another.

Also an object of the invention is a standardized, motherboard assembly of electronic componentry and connections for seismic data processing that is universally connected with any of several environmental protection housings.

A still further object of the invention is a standardized motherboard assembly of electronic components for seismic data processing equipment that is enclosed or encased by a light, intimate shield suitable only for protection from shipping damage.

It is also an object of the invention to provide a method for quickly and inexpensively transporting the bulk of capital value equipment from one jobsite to another.

Also, an object of the invention is a method of advancing the equipment layout of one seismic job that may require a majority of the preparation labor with only a small fraction of the necessary equipment capital value while equipment representing the major capital value is in use elsewhere.

These and other objects of the invention, as will become apparent from an understanding of the following description of the preferred embodiments, are served by a unit motherboard design that is standardized for all housings in a seismic survey provider's inventory. The unitized motherboard is encapsulated, encased or enclosed for protection against ordinary personnel handling damage such as extraction from an outer housing, insertion into an outer housing or assembling with other motherboard units in a shipping or transport crate.

Projecting from the protective enclosure of the unitized motherboard are one or more flexible connection harnesses for convenient electrical continuity of the motherboard circuitry with external data transmission cable. Exterior cable connectors of suitable specification for the type of outer housing protection required are secured to the housing cover. On the inside face of the housing cover, the cable connector wiring pins are hard-wired to a mating harness connection.

Minimal electrical componetry may be secured to the housing cover such as lightening surge arrestors as is distinctively necessary for the use environment respective to a particular type of housing.

A seismic survey company may devote available capital to outer protective housings without the expensive internal circuitry. A singular set of internal circuitry may be dedicated to a given seismic survey crew. As the crew moves from one survey location to another, it takes only the internal circuitry with it. Other, less skilled labor, may perform the task of assembling, organizing, packaging and transporting circuitry stripped of protective housings away from the prior survey field. Similarly, as a crew is still working a prior job with the portable circuitry, others may lay out the new survey equipment grid with only the protective outer housings. When the prior job is complete, the data handling circuitry is removed from the housings on the ground at the completed job, transported directly to the new job and inserted into the housings that are already in place on the ground of the new job site.

BRIEF DESCRIPTION OF THE DRAWINGS

The advantages and further aspects of the invention will be readily appreciated by those of ordinary skill in the art as the same becomes better understood by reference to the following detailed description when considered in conjunction with the accompanying drawings in which like reference characters designated like or similar elements throughout.

DESCRIPTION OF THE PREFERRED EMBODIMENTS

Figure 1:
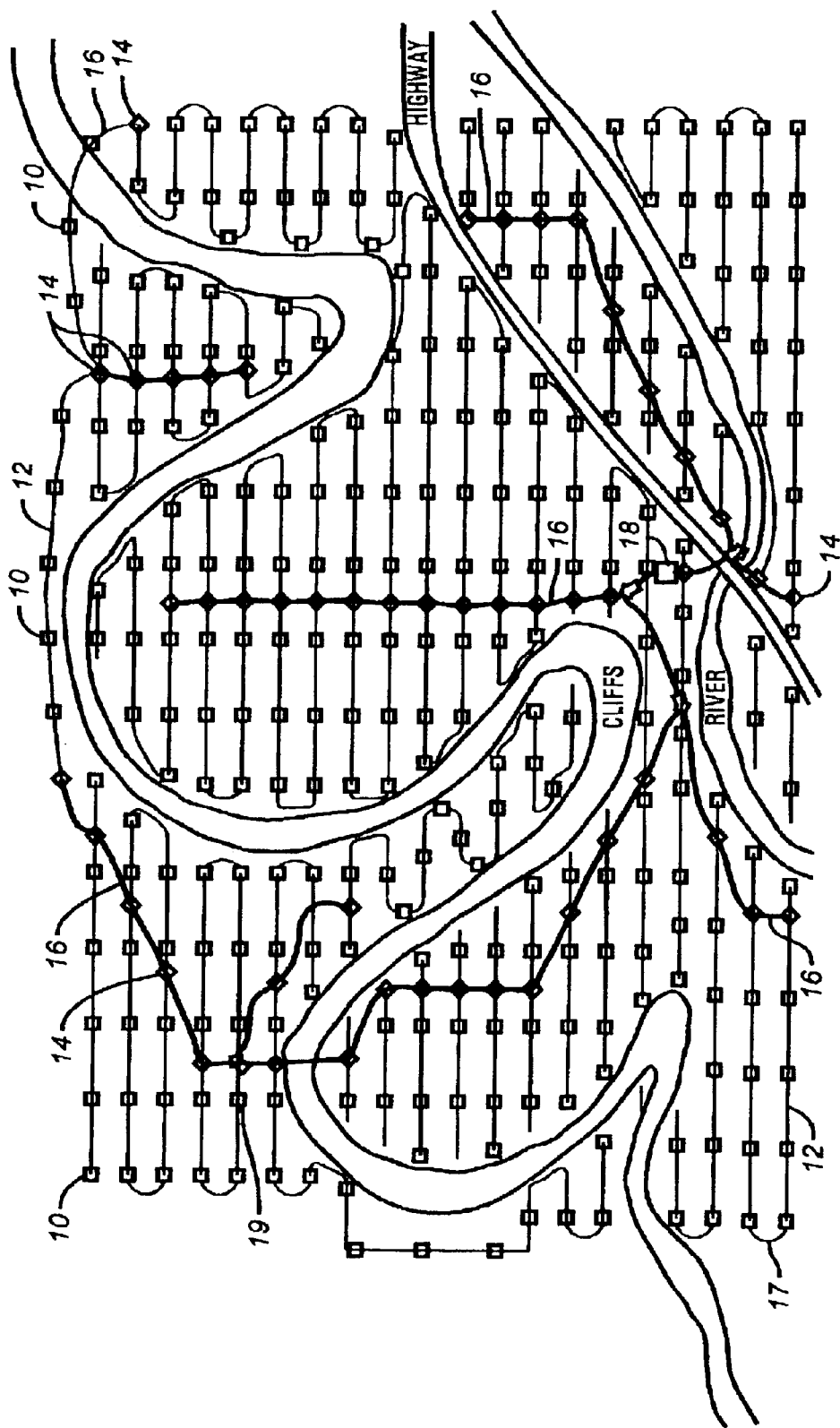
FIG. 1 is a schematic representation of a typical seismic survey field layout; and, FIG. 2 is an exploded view of a data acquisition module according to the present invention.

For environmental reference, a typical seismic survey grid is shown schematically by FIG. 1 to include a large number of data acquisition modules 10 having orderly cable connections along receiver lines 12 to respective base line units 14. Signal transmissions out-going from the baseline units 14 are carried along base lines 16 to a central recording unit 18.

Figure 2:
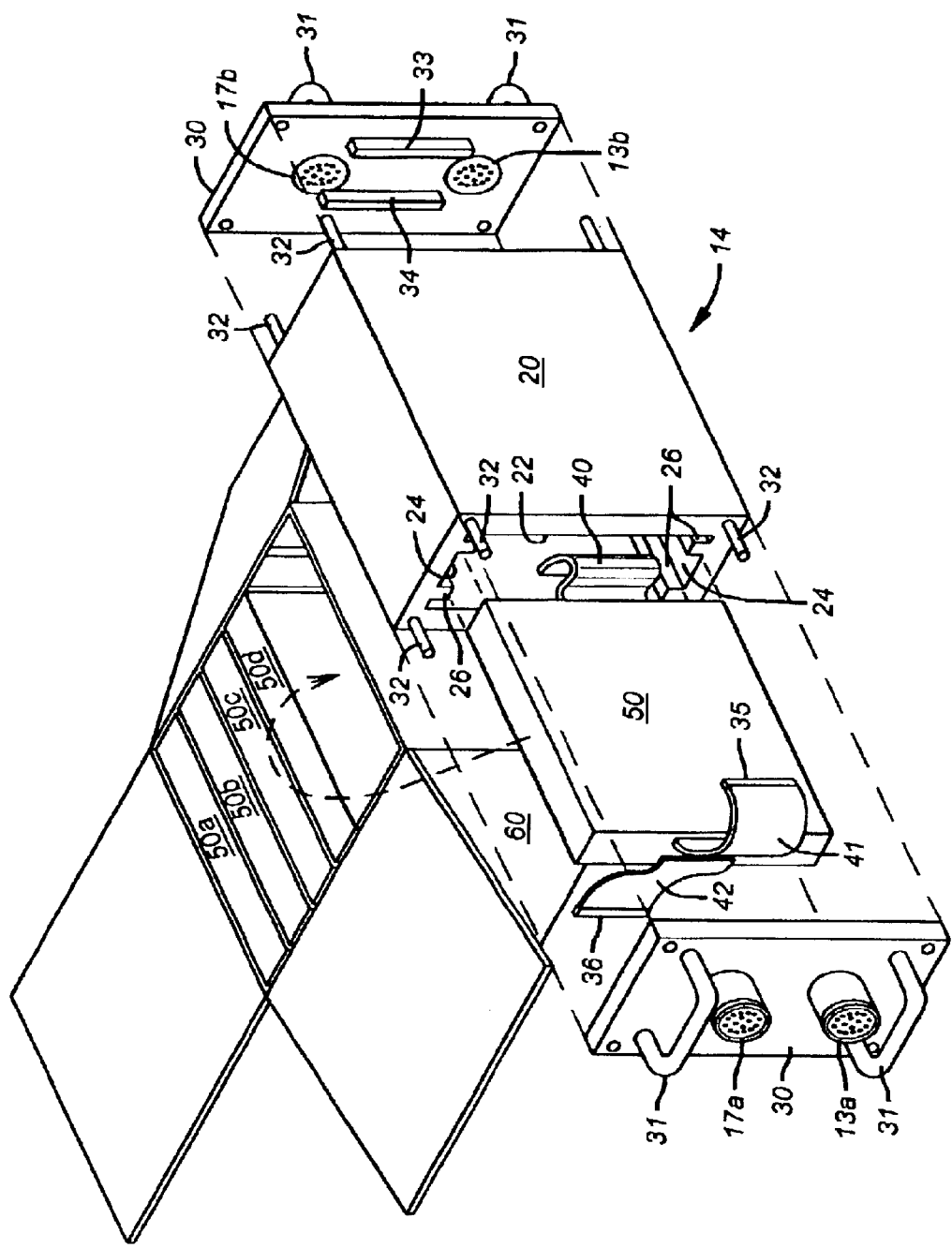

With respect to FIG. 2, a base line unit 14 is shown in exploded assembly perspective to include a protective outer casing or housing 20 having an interior void space 22. A data acquisition module 10 may appear substantially the same with modified internal circuitry in the motherboard 50. Although addressed herein to a base line unit 14, the following description of the invention is equally applicable to either a base line unit 14, a data acquisition module 10 or any of several special purpose signal processing devices normally used in a seismic survey task. Along opposite walls of the housing 20 are opposing stabilizing channels 24 formed between parallel rails 26. Opposite ends of the outer housing 20 are environmentally sealed by appropriate closure elements such as end caps or end plates 30. The end caps are compressively secured by threaded studs 32 projecting from the housing end planes. The perimeter of a cap is compressed against a resilient moisture barrier gasket not shown.

The outer housing 20 of this example is shown with two caps 30 at respectively opposite ends of the housing. It will be understood by those of ordinary skill, however, that the housing may be constructed in the form of vessel having only one detachable end cap 30. A pair of manual handling bails 31 projecting from the outer face of each end cap 30 provides some physical protection for the cable bulk head connectors 13 and 17 which project outwardly from the outer face of the end caps. Each of the end caps 30 is fitted with two bulkhead cable connectors: 13a and 17a respective to one end cap and 13b and 17b respective to the other end cap. The connector 13a receives the data packet signals along the receiver line 12 on one side of the base line whereas the connector 13b receives data packet signals along the receiver line 12 from the opposite side of the base line. The bulkhead cable connector 17b receives base line 16 carried signals from base line units 14 that are more remote from the central recording unit 18 whereas the connector 17a relays the signals received along the outer base line 16 and adds the signals received from both receiver lines 12.

The connectors 13 and 17 pass electrical continuity carried in linking signal cables through the end caps 30 along highly insulated and moisture sealed conduits. On the inner face of the end caps, the connector conduits 13 and 17 are connected to respective socket bases 33 and 34 shown on the inside surface of one of the end caps 30. Socket bases corresponding to the connectors 13a and 17a are on the inside surface of the other end cap 30 but not shown due to the perspective. The socket bases 33 and 34 mate with respective ribbon connector pins such as 35 and 36 at the end of ribbon cables 41 and 42. Ribbon cables 40, 41, and 42 are connected to various circuits and subcircuits on the motherboard 50 and penetrate a contiguous mechanical protection 51 around the motherboard 50. This intimate motherboard protection need not be of the same nature as the outer housing 20. For example, an extruded plastic cladding of the circuit components may be sufficient to protect the circuitry from ordinary handling damage which is all that is expected of the contiguous motherboard protection. In another example, the motherboard handling protection may be provided by a cast acrylic encapsulation of the motherboard circuit. Another example may include a preformed rigid or semirigid plastic envelope into which the motherboard circuit is inserted. The envelope is then closed and secured. A further example may include a heat shrinkable polymer enclosure.

In a preferred example, the motherboard 50 is encapsulated within a coating of glass-fiber reinforced polymer 51. The exterior shape and dimension of each enclosure-protected motherboard is standardized within acceptable tolerances for meshing between the internal channels 24 inside of the outer protective housing 20. Although all outer protective housings in a seismic survey inventory may vary considerably, in size, weight and performance characteristics, the housing motherboard slot between channels 24 preferably is a standard dimension and fit for all housings.

In a correlative method, a suitable packing carton 60 is provided to receive a discrete plurality of isolated motherboard units 50a–50d. These motherboard units are densely packaged for efficient transport. Accordingly, when a survey job in the tropics is completed, for example, the motherboards 50 are extracted from the data acquisition modules 10 and base line units 14 at the tropical jobsite, placed in a suitable carton 60, and flown, for example, to the next jobsite which may be, for example, in the Arctic. Since the volume and weight of a motherboard unit 50 is only a fraction of the outer housing 20 weight and volume, many more of the motherboard units 50 may be combined in a single carton.

In the meantime, a separate survey crew has distributed outer housings sans electronic circuitry, over the grid of the arctic survey site. Since these outer housings, without the motherboard, are relatively inexpensive, an entire survey site may be prepared before the motherboards arrive. When the motherboards arrive at the arctic survey site, it is only necessary to open the arctic housings, insert the respective motherboards, connect the ribbon cables, and proceed with the survey.

Although our invention has been described in terms of specified embodiments which are set forth in detail, it should be understood that this is by illustration only and that the invention is not necessarily limited thereto. Alternative embodiments and operating techniques will become apparent to those of ordinary skill in the art in view of the present disclosure. Accordingly, modifications of the invention are contemplated which may be made without departing from the spirit of the claimed invention.

What is claimed is:

1. A seismic signal processing assembly comprising the combination of:
   (a) a motherboard unit (50) having a substantial portion of essential signal processing circuitry enclosed within a contiguous protective barrier (51);
   (b) an outer housing (20) having an internal cavity (22) therein for removably receiving said motherboard unit (50) therein;
   (c) a cavity closure element (30) for environmentally isolating said motherboard unit (50) within said internal cavity (22);
   (d) a first signal connector (13, 17) secured to said closure element (30) for transfer of signal continuity through said closure element (30); and,
   (e) a second signal connector (41, 42) having a first end connected with said signal processing circuitry and a second end projecting from said motherboard unit for selective connection and disconnection respective to said first signal connector (13, 17).

2. A seismic signal processing assembly as described by claim 1 wherein said contiguous protective barrier (51) is a glass fiber reinforced polymer.

3. A seismic signal processing assembly as described by claim 1 wherein said contiguous protective barrier (51) is a plastic sheathing.

4. A seismic signal processing assembly as described by claim 1 wherein said contiguous protective barrier (51) is an acrylic casting.

5. A seismic signal processing assembly as described by claim 1 wherein said contiguous protective barrier (51) is a heat shrinkable polymer.

6. A seismic signal processing assembly as described by claim 1 comprising a pair of cavity closure elements (30) respective to opposite ends of said housing.

7. A seismic signal processing assembly as described by claim 6 comprising a pair of second signal connectors (41, 42) having second ends (35, 36) projecting from said motherboard unit for selective connection with first signal connectors (13, 17) respective to each of said cavity closure elements (30).

8. A seismic signal processing assembly comprising the combination of:
   (a) a motherboard unit (50) comprising a substantial portion of electronic signal processing circuitry essential to the operation of the assembly enveloped by a contiguous protective barrier (51).
   (b) an external housing (20) having an internal cavity (22) therein for removably receiving said motherboard unit (50) therein, said housing having a removable closure element (30) for environmentally isolating said internal cavity;
   (c) a first signal connector (13, 17) secured to said housing for transfer of signal continuity through said housing; and,
   (d) a second signal connector (41, 42) for selectively connecting said signal processing circuitry to said first signal connector.

9. A seismic signal processing assembly as described by claim 8 wherein said contiguous protective barrier (51) is a fiber reinforced polymer.

10. A seismic signal processing assembly as described by claim 8 wherein said contiguous protective barrier (51) is a plastic sheathing.

11. A seismic signal processing assembly as described by claim 8 wherein said contiguous protective barrier (51) is an acrylic casting.

12. A seismic signal processing assembly as described by claim 8 wherein said contiguous protective barrier (51) is a heat shrinkable polymer.

13. A seismic signal processing assembly as described by claim 8 wherein said first signal connector (13, 17) is secured to said removable closure element (30).

14. A seismic signal processing assembly as described by claim 8 comprising a pair of removable closure elements (30) respective to opposite ends of said housing (20).

15. A seismic signal processing assembly as described by claim 14 comprising a pair of second signal connectors (41, 42) having second ends projecting from said motherboard unit (50) for selective connection with first signal connectors (13, 17) respective to each of said removable closure elements (30).

16. A motherboard for a seismic signal processing module comprising:
   (a) a structural substrate (50) supporting a substantial portion of electronic signal processing circuitry essential to the operation of said module, said substrate being configured for selective confinement within an external housing (20);
   (b) a protective enclosure (51) intimately covering said substrate (50) and circuitry for substantially isolating said circuitry from manual contact when said module is manually handled externally of said housing; and,
   (c) a releasable conduit connector (35, 36) projecting from said enclosure for connecting said signal processing circuitry with a housing wall connector (13, 17) internally of said external housing.

17. A motherboard for a seismic signal processing module as described by claim 16 wherein said protective enclosure (51) is a fiber reinforced polymer.

18. A motherboard for a seismic signal processing module as described by claim 16 wherein said protective enclosure (51) is a plastic sheathing.

19. A motherboard for a seismic signal processing module as described by claim 16 wherein said protective enclosure (51) is an acrylic casting.

20. A motherboard for a seismic signal processing module as described by claim 16 wherein said protective enclosure (51) is a heat shrinkable polymer.

* * * * *